United States Patent

[11] 3,628,081

[72] Inventor Barouh V. Berkovitz
Newton Highlands, Mass.
[21] Appl. No. 872,231
[22] Filed Oct. 29, 1969
[45] Patented Dec. 14, 1971
[73] Assignee American Optical Corporation
Southbridge, Mass.

[54] PROGRESSIVELY ERASING AND UPDATING STORAGE TUBE FOR ECG. DISPLAY
11 Claims, 4 Drawing Figs.

[52] U.S. Cl. ..................................... 315/12,
313/68, 178/7.2
[51] Int. Cl. ..................................... H01j 29/41
[50] Field of Search ............................ 315/12, 28;
313/65 TP, 68 B, 68 A, 89, 92, 108 B; 178/7.2

[56] References Cited
UNITED STATES PATENTS
3,214,631 10/1965 Anderson ..................... 313/68 A
3,519,874 7/1970 Pearson ........................ 315/12
3,356,878 12/1967 Yaggy et al. .................. 315/12

OTHER REFERENCES
Roland, Screen for Dock Trace Tube, 8/65, pp. 422–423, IBM Technical Disclosure Bulletin, Vol. 8, No. 3

Primary Examiner—Rodney D. Bennett, Jr.
Assistant Examiner—N. Moskowitz
Attorneys—William C. Nealon, Noble S. Williams, Robert J. Bird and Amster & Rothstein ABSTRACT: An ECG. display on which the ECG. signal appears on a storage cathode-ray tube. Instead of erasing the entire display at the end of each line trace, only a short segment at the leftmost side of the trace is erased. As the new sweep begins, the old trace is progressively erased. In effect, an "erase" signal precedes the write beam as it moves from left to right across the screen. The arrangement permits display of each ECG. waveform for the maximum time period.

Patented Dec. 14, 1971 3,628,081
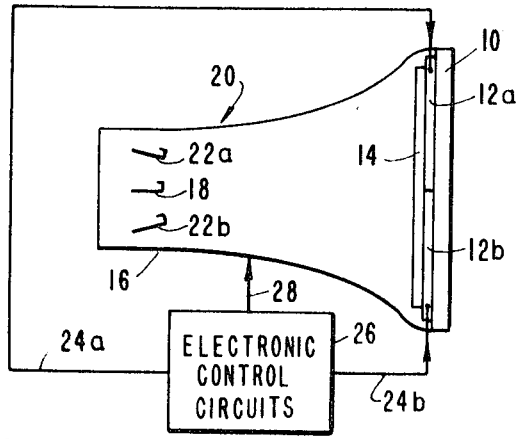
FIG. 1 PRIOR ART
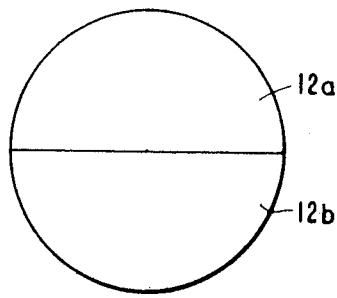
FIG. 2 PRIOR ART
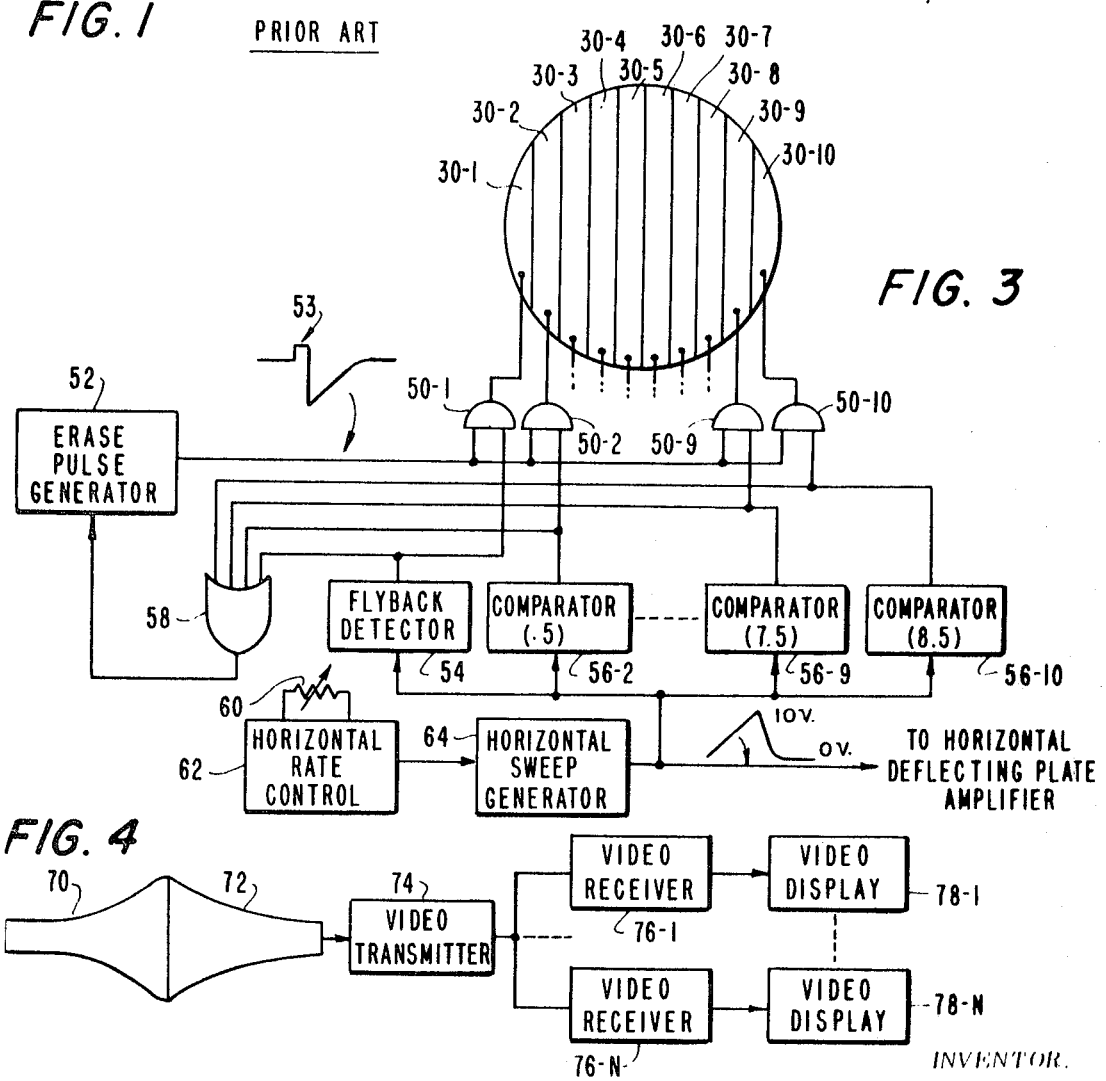
FIG. 3
FIG. 4
INVENTOR.
BAROUH V. BERKOVITS
BY Amster & Rothstein
ATTORNEYS

PROGRESSIVELY ERASING AND UPDATING STORAGE TUBE FOR ECG. DISPLAY

This invention relates to electrocardiographic ECG. displays, and more particularly to ECG. displays which incorporate storage cathode-ray tubes.

On a typical ECG. display, after each waveform appears it persists for only a short time interval. As the trace moves from left to right across the screen, only the last few waveforms can be seen. It would be desirable to have a longer persistance for each waveform so that each new waveform could be observed with preceding waveforms.

It has been proposed to utilize a storage cathode-ray tube for this purpose. With such a tube, it is possible to provide an ECG. display in which all information which appears on the display persists until the end of each line trace. During the flyback, the entire line is erased prior to the start of a new trace. Although this arrangement does permit the waveforms at the end of each line trace to be observed along with preceding waveforms, it is apparent that the same is not true of the waveforms at the beginning of each trace—when they are formed there are no other waveforms on the screen.

It is an object of my invention to provide a display for a repetitive signal in which every signal, after it is formed on the display, persists for an extended time interval.

It is another object of my invention to provide such a display for an ECG. monitoring system.

Briefly, in accordance with the principles of my invention, a conventional split-screen storage cathode-ray tube is modified to permit the progressive erasing of the display preceding each new trace. In the ordinary storage tube, there is a transparent backplate sandwiched between the faceplate and the phosphor layer. The backplate is ordinarily held at a high potential; to erase the display, a negative pulse is applied to the backplate. In the split-screen type tube, instead of a single continuous backplate, there are upper and lower backplate sections which are electrically isolated from each other. In effect, the backplate can be considered to have a horizontal dividing line along the center of the screen. When either backplate section is pulsed, the respective upper or lower half of the screen display is erased.

In accordance with the principles of my invention, instead of two horizontal backplate sections, the tube includes a plurality of electrically isolated vertical sections. Each of these sections can be pulsed individually. When a vertical backplate section is pulsed, it causes the erasure of only that part of the screen adjacent to the particular section. To control a progressive erasure which precedes the write beam, the vertical backplate sections are pulsed in succession from left to right, with any section being pulsed just before the write beam reaches it.

It is a feature of my invention to provide a storage cathode-ray tube having a plurality of electrically isolated backplate sections, each of which when pulsed causes the corresponding section of the display to be erased.

It is another feature of my invention to provide a circuit for pulsing each backplate section just prior to the write beam reaching the corresponding portion of the phosphor layer.

Further objects, features, and advantages of my invention will become apparent upon consideration of the following detailed description in conjunction with the drawing, in which:

FIG. 1 depicts schematically the prior art split-screen storage cathode-ray tube;

FIG. 2 depicts schematically the arrangement of the prior art backplate used in the cathode-ray tube of FIG. 1, FIG. 3 depicts schematically an illustrative embodiment of my invention; and FIG. 4 illustrates a system which utilizes a modified storage tube of my invention to the greatest advantage.

FIG. 1 depicts various elements in a conventional split-screen storage cathode-ray tube 20. Sandwiched between faceplate 10 and storage-target layer 14 are two halves of the storage-target backplate, 12a and 12b. A front view of the backplate is shown in FIG. 2. The two sections 12a and 12b are electrically isolated from each other. The cathode-ray tube includes a write gun 18 and two flood guns 22a and 22b. The two flood guns, as is known in the art, control the storage of the display. The entire cathode-ray tube is contained in glass envelope 16. Electronic control circuits 26 control the storage and erasure of the display on either half of the screen. When either of conductors 24a and 24b is negatively pulsed, the display on the respective upper and lower half of the screen is erased. Additional control signals for the cathode-ray tube are transmitted over cable 28. The operation and design of storage cathode-ray tubes in general, and split-screen tubes in particular, are well known to those skilled in the art. A complete description of the subject matter can be found in a booklet entitled "Storage Cathode-Ray Tubes And Circuits" by Chuck DeVere, published in 1968 by Tektronix, Inc.

FIG. 3 depicts an illustrative embodiment of my invention; only those elements which are different from, or in addition to, those in FIGS. 1 and 2 are depicted in the drawing. It is to be understood, for example, that although only the storage-target backplate consisting of vertical segments 30-1 through 30-10 is shown, the storage tube of the system of FIG. 3 includes a phosphor layer 14, a faceplate 10, the various electron guns, etc.

Instead of utilizing a horizontally split backplate as shown in FIG. 2, the system of FIG. 3 utilizes vertically split backplate. In the illustrative embodiment of the invention, the screen is divided into 10 electrically isolated segments 30-1 through 30-10. The output of respective one of gates 50-1 through 50-10 is extended to each of the backplate sections. One input of gate 50-1 is connected to the output of flyback detector 54. One input of each of gates 50-2 through 50-10 is connected to the output of a respective one of comparators 56-2 through 56-10. The other input of each of the ten gates is connected to the output of erase pulse generator 52. When the erase pulse generator is triggered, it generates an erase pulse 53 at its output. When the erase pulse is generated only one of gates 50-1 through 50-10 is operative, and the erase pulse is transmitted to the respective vertical backplate segment.

The output flyback detector 54 and the outputs of all of comparators 56-2 through 56-10 are connected to respective inputs of OR-gate 58. When any one of the flyback detector or the nine comparators operates, the OR gate triggers the erase pulse generator. At this time the erase pulse is transmitted to the respective one of the vertical backplate segments.

The electronic control circuits include a horizontal rate control circuit 62 with a manually adjustable potentiometer 60. The setting of the potentiometer determines the horizontal sweep rate. The output of the horizontal rate control circuit 62 is extended to the input of horizontal sweep generator 64. A sawtooth waveform appears at the output of the sweep generator. This sawtooth, extending between zero and 10 volts in a time period corresponding to the setting of potentiometer 60, is directed to the horizontal deflecting plate amplifier, which in turn derives a sawtooth waveform sufficient in magnitude to drive the electron write beam across the screen.

The sawtooth waveform is also extended to the input of flyback detector 54 and the input of each of the nine comparators 56-2 through 56-10. Flyback detector 54 detects the flyback following each sweep across the tube. The output of the detector is energized and an erase pulse is transmitted through gate 50-1 to backplate segment 30-1. Thus during flyback, the first 10 percent of the display on the screen is erased. The first 10 percent of the display is erased prior to the start of a new sweep. The remaining 90 percent of the previous trace is still displayed.

Each comparator energizes its output when the positively sloping sawtooth voltage reaches a respective level. Comparator 56-2 energizes its output when the sawtooth waveform has risen to 0.5 volts. At this time, the new trace is in the middle of the first segment 30-1. With the energization of comparator 56-2, that portion of the old trace beneath segment 30-2 is erased. As the new trace continues, the sawtooth waveform continues to rise in voltage. When it has risen to 1.5 volts, comparator 56-3 (not shown) energizes its output. At this time, the new trace is in the middle of segment 30-2 and the old trace is in segment 30-3 is erased.

Similarly, when the new trace is in the middle of segment 30-8, the sawtooth waveform is at a level of 7.5 volts. At this time the old trace adjacent to segment 30-9 is erased. Finally, when the new trace is in the middle of segment 30-9, comparator 56-10 operates and the last 10 percent of the old trace is erased.

It is apparent that, as the write beam sweeps across the face of the cathode-ray tube, that portion of the old trace immediately ahead of the write beam is erased. The erased portion of the display ahead of the write beam in the arrangement of FIG. 3 varies between 5 and 15 percent of the width of the entire display. For example, when the new beam reaches the middle of section 30-2, section 30-3 is pulsed and the old trace is then erased along the remaining latter half of section 30-2 and the width of section 30-3, a total distance corresponding to 15 percent of the entire width of the display. On the other hand, just before the write beam reaches the midpoint of section 30-2, the only erased portion of the display is the latter half of section 30-2, a width corresponding to 5 percent of the entire display. It is apparent that if more vertical sections are used, the range of the width of the erased portion can be narrowed. For example, with 20 vertical segments, the range varies between 2.5 and 7.5 percent of the entire display. Similarly, it is possible to pulse a vertical section which is two or more sections ahead of the write beam in order that a larger erased portion of the display precede the write beam. This can be accomplished in the system of FIG. 3 simply be increasing the slope and peak level of the sawtooth at the output of sweep generator 64.

Storage tubes in general are relatively expensive. The smaller the display area, the cheaper the tube. The arrangement of FIG. 4 illustrates how a very small storage tube can be utilized in an ECG. display system. Storage tube 70 is of the type depicted in FIG. 3. To the face of the tube there is attached a TV scanner 72. The resulting TV signal is applied to the input of video transmitter 74, which in turn is connected to a plurality of video receivers 76-1 through 76-N. Each video receiver controls a display on a respective one of displays 78-1 through 78-N. The size of each video display can be much larger than the size of the display on the screen of storage tube 70. The arrangement of FIG. 4 is particularly advantageous when it is necessary to direct the same ECG. signal to a number of stations. Rather than to use a vertically segmented storage tube at each station, it is only necessary to provide a single such tube together with a relatively inexpensive video receiver and display at each station.

In the system of FIG. 4, the storage tube does not provide a visual display, since the visual display is "covered up" by TV scanner 72. Rather than to provide two separate elements 70 and 72, it is possible to utilize a single storage tube with a "read" capability. In such a case, as a trace is stored (with or without a visual output), it is continuously read with the resulting video signal being forwarded to all of the video receiver-display stations.

It will also be obvious to those skilled in the art that other arrangements can be used for generating an "erase" signal which precedes the "write" signal as it sweeps across the storage tube. For example, in the conventional storage tube the flood guns cause electrons to bombard the entire screen. By providing additional horizontal deflecting plates, for example, it is possible to momentarily stop the flooding of the screen along a particular vertical section. In such a case, that portion of the trace corresponding to the section which is no longer flooded will be erased.

Although the invention has been described with reference to particular embodiments, it is to be understood that these embodiments are merely illustrative of the application of the principles of the invention. Numerous modifications may be made therein and other arrangements may be devised without departing from the spirit and scope of the invention.

What I claim is:

1. In a storage cathode-ray tube system in which a write beam sweeps across the face of a storage cathode-ray tube in one direction, the improvement comprising means for erasing the stored signal contained within any one of a plurality of sections of the display perpendicular to said one direction, and means for sequentially erasing the display in successive sections in the same direction in which said write beam sweeps across the face of the tube.

2. An improved storage cathode-ray tube system in accordance with claim 1 wherein said erasing means controls the erasure of the display in any one of said sections when the write beam is in the preceding section in the direction of the sweep of said write beam across the face of said tube.

3. An improved storage cathode-ray tube system in accordance with claim 2 wherein said erasing means includes a tube backplate segmented into a plurality of sections perpendicular to said one direction and means for applying an erase pulse to any one of said segments individually.

4. An improved storage cathode-ray tube system in accordance with claim 1 wherein said erasing means includes a tube backplate segmented into a plurality of sections perpendicular to said one direction and means for applying an erase pulse to any one of said segments individually.

5. An improved storage cathode-ray tube system in accordance with claim 4 wherein said segmented backplate sections are sequentially pulsed at a rate determined by the time required for said write beam to sweep across the face of the cathode-ray tube.

6. In a storage cathode-ray tube having a source of a write beam which sweeps across the face of the tube and a backplate which when pulsed erases the stored signal adjacent to it, the improvement comprising the arrangement of said backplate in a plurality of sections each perpendicular to the direction in which said write beam sweeps across the face of the tube, and means connected to each of said backplate sections for transmitting thereto a pulse for erasing only that portion of the stored signal adjacent to the particular section.

7. An ECG. signal storage system comprising a storage cathode-ray tube in which a write beam sweeps across the face of the tube, means for controlling the deflection of said write beam in a direction perpendicular to the direction of said sweep in accordance with the magnitude of an ECG. signal, and means for continuously erasing only a portion of the signal stored in said cathode-ray tube in the direction of said sweep in front of said write beam.

8. A ECG. signal storage system in accordance with claim 7 wherein said erasing means includes a backplate on said cathode-ray tube segmented into a plurality of sections perpendicular to the direction of said sweep and means for applying erase pulse to successive segments of said backplate sequentially in the direction of said sweep.

9. An ECG. signal storage system in accordance with claim 8 wherein said segmented backplate sections are sequentially pulsed at a rate determined by the time required for said write beam to sweep across the face of said cathode-ray tube.

10. A ECG. signal storage system in accordance with claim 6 wherein the rate at which the storage signal is erased in front of said write beam is dependent upon the time required for said write beam to sweep across the face of the cathode-ray tube.

11. In a storage cathode-ray tube used for storing a ECG. signal and having a source of a write beam which sweeps across the face of the tube and is deflected in accordance with the magnitude of an ECG. signal, and a backplate which when pulsed erases the stored ECG. signal adjacent to it, the improvement comprising the arrangement of said backplate in a plurality of sections each perpendicular to the direction in which said write beam sweeps across the face of the tube, and means connected to each of said backplate sections for transmitting thereto a pulse for erasing only that portion of the stored ECG. signal adjacent to the particular section.

* * * * *